Sept. 6, 1966 W. KOHLHAGEN 3,271,599
OSCILLATING D.C. MOTOR OF REGULATED OUTPUT TORQUE
Filed April 14, 1964 5 Sheets-Sheet 1

INVENTOR.
Walter Kohlhagen
BY
Attorney.

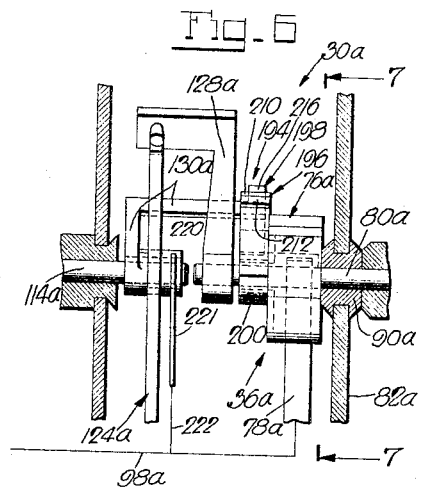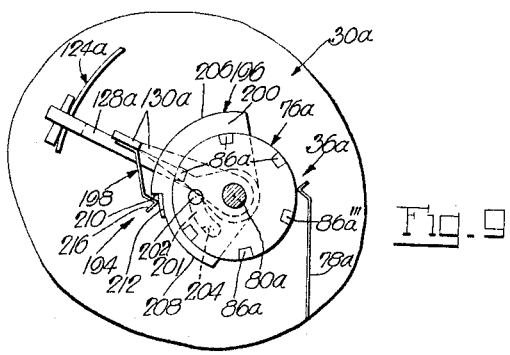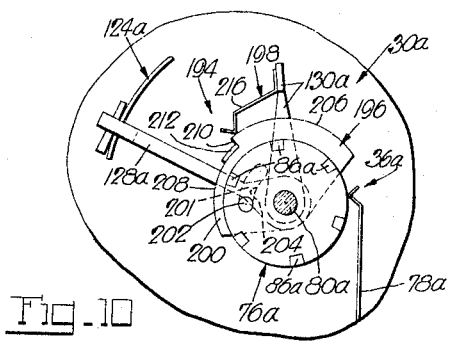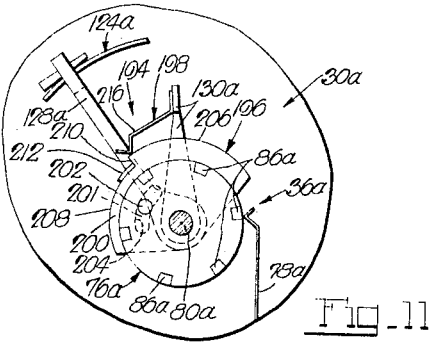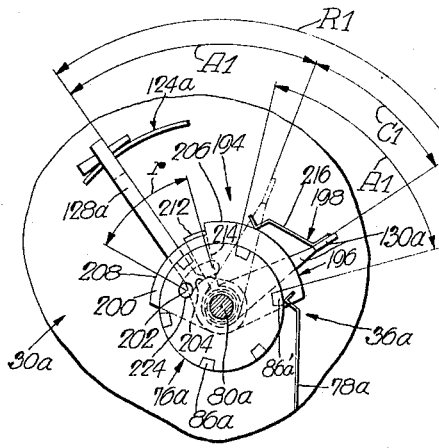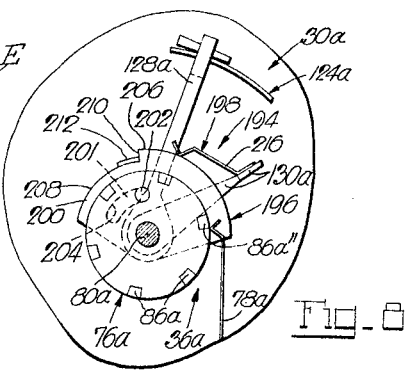

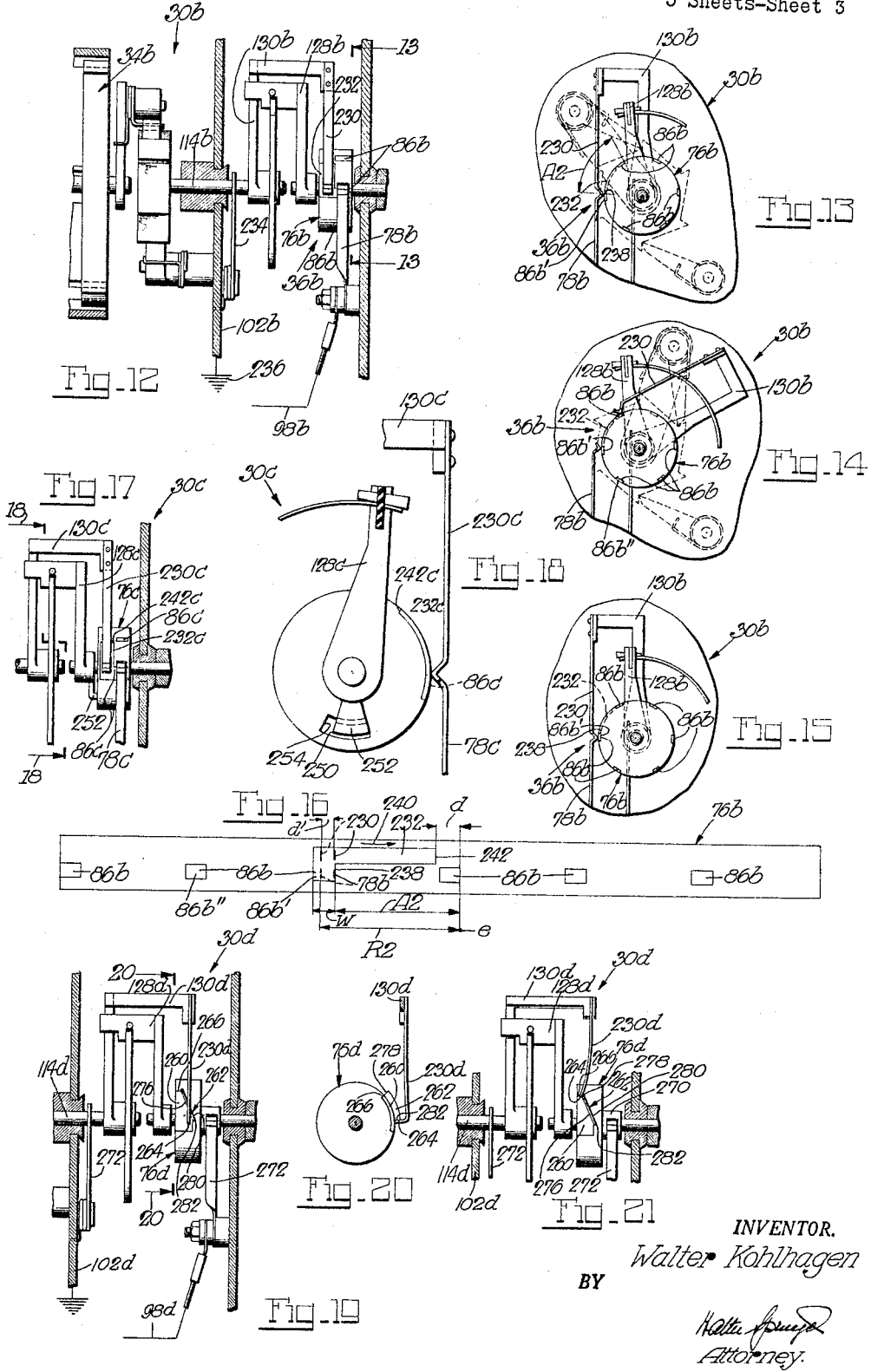

Sept. 6, 1966  W. KOHLHAGEN  3,271,599
OSCILLATING D.C. MOTOR OF REGULATED OUTPUT TORQUE
Filed April 14, 1964  5 Sheets-Sheet 4

INVENTOR.
Walter Kohlhagen
BY
Attorney.

United States Patent Office 3,271,599
Patented Sept. 6, 1966

3,271,599
OSCILLATING D.C. MOTOR OF REGULATED
OUTPUT TORQUE
Walter Kohlhagen, 818 Oakley Ave., Elgin, Ill.
Filed Apr. 14, 1964, Ser. No. 359,629
11 Claims. (Cl. 310—36)

This invention relates to electric motors of constant torque output in general, and to electric motors of constant spring torque output in particular.

The type of motor to which the present invention pertains has a field structure, a rotor and a commutation device, of which the rotor and the rotary unit of the commutation device, usually the commutator, are separated from each other and drivingly connected by a preloaded coupling spring which compels the commutator to turn in the same direction as the rotor. The rotor thus steps intermittently on successive energizations of the field coils under the control of the commutation device, and the commutator puts out the torque of the coupling spring which may be substantially constant or vary constantly between the preload of the spring and its operational peak deflection on each redeflection of the same by the rotor, depending on the load on the commutator. In most cases, the output torque of the motor under load varies constantly and may be made to vary within a sufficiently narrow range to be to all practical intents and purposes constant for many practical purposes. To prevent rundown of the spring when the motor is idle, the motor is also provided with a lost-motion connection between the rotor and commutator which permits relative rotation between them through a limited range within part of which the rotor may turn in phase with the magnetic field in the field structure, and to one end of which the coupling spring will, on current interruption, urge the commutator and rotor so that the latter will continue in the same phase relation with the magnetic field on reapplication of the current.

Motors of this type may be used for diverse purposes, and they are used quite extensively for timing purposes. To adapt them for timing purposes, these motors are equipped with an escapement which controls the spring-drive of the commutator, so that the magnetic field in the field structure, and hence also the rotor, will advance rotatively in intermittent steps between rest periods which are also under the control of the escapement. For low cost as well as accurate performance of the escapement, the same is customarily kept rather small, with the spring torque of the motor being kept correspondingly small but nonetheless sufficiently high to power in most cases a clock or other timing device. It is, of course, also feasible to use in lieu of the spring torque the higher magnetic torque of the rotor for powering a clock or other timing device or devices.

The commutation of motors of this type is customarily arranged so that in any angular position of the rotor the commutator will close the circuit of the field coil or coils required for normal motor operation regardless of the position of the commutator relative to the rotor within their aforementioned lost-motion range. In thus arranging the commutation, the magnetic field in the field structure will step forward for each operational redeflection of the coupling spring and will remain stationary during each operational partial rundown of this spring to its preload level, with renewed motor start after a stop or on current restoration after power failure being assured, but current consumption is constant during motor operation. This constant current consumption during motor operation is, of course, a drawback of motors of this type in any event, and is particularly disadvantageous in battery-powered motors of this type used in timing devices such as house or automobile clocks, for example.

It is an object of the present invention to provide a motor of this type in which current is supplied to the field for and during each brief operational redeflection, i.e., rewind of the coupling spring of preferred spiral type, and current flow to the field is interrupted during the partial rundown of much longer duration of this spring between its periodic rewinds, with the commutation being arranged so that the motor will assuredly start on circuit closure after an intentional motor stop or on current restoration after power failure at any time.

It is another object of the present invention to provide a motor of this type in which the rotor may be of oscilliatory or stepping kind, and in which there is arranged in the rotor drive of the coupling spring a one-way device which on each deenergization of the field between rewinds of the spring during motor operation prevents the spring from turning the rotor back, with the one-way device being advantageously of pawl-and-ratchet or equivalent type to keep the driven end of the spring in the same identical angular relation to the commutator at each stop of the motor from any cause, whether intended or due to sudden current failure. With this arrangement, the commutation may be designed for an assured start of the motor after each stop thereof.

It is a further object of the present invention to provide a motor of this type in which there is a preferred single field coil for a rotor of either oscillatory or stepping kind, thereby to keep the commutation simple and the parts thereof at a minimum number, as well as keep the cost of the motor low.

Another object of the present invention is to provide a motor of this type in which all makes and breaks of the commutation during operation of the motor and on a start thereof are made preferably by the spring-driven part of the commutation device, usually the commutator, and the companion part thereof, i.e., the brush part, thereby to keep the commutation performance at the highest reliability and accuracy as well as achieve optimum structural simplicity of the commutation device.

A further object of the present invention is to provide a motor of this type in one form in which during its operation and for its start after a stop all makes of the commutation are made jointly by the spring-driven commutator and a single fixed companion brush. To this end, the conductive segments of the commutator are made of a width sufficiently in excess of that required for a complete forward step response of the rotor to each field coil energization to assure that the commutator, on its spring drive to the end of its lost-motion connection with the rotor on current failure or intended current interruption, will come to rest with one of its segments in contact with the brush. While this involves during normal motor operation field coil energization for a period somewhat longer than required for each complete forward step of the rotor, the commutation device thus provided affords the ultimate in simplicity.

It is another object of the present invention to provide a motor of this type in a different form in which the commutation device has the aforementioned spring-driven commutator and single fixed companion brush, except that the conductive commutator segments are of a width just sufficient to cause during their brief contact with the brush in normal motor operation complete forward step responses of the rotor. To this end, the lost-motion connection between the rotor and commutator will have such a spread that on the spring-drive of the commutator to the leading end of this connection pursuant to current failure or willful current interruption, the commutator will come to rest with its segments out of contact with the brush, and there is provided in the field coil circuit a switch in parallel with of the commutation device, with the switch being closed only when the commutator is on current interruption at the leading end of its lost-motion connection with the rotor and until on subsequent current restoration the rotor has responded with a full, or nearly full, forward step. With this arrangement, the switch returns the field coil to the normal control of the commutation device on restoration of the current after each current failure or willful current interruption, and the intervals of periodic current application during motor operation are appreciably shortened.

It is a further object of the present invention to provide a motor of this type in still another form in which during its operation and for its start after a stop all makes of the commutation are made jointly by the spring-driven commutator and two brushes of which one is fixed and the other is drivingly connected with the rotor to be on successive forward steps of the latter advanced through the same angular distance progressively in the drive direction of the commutator, while all breaks of the commutation are made by the commutator and the rotor-driven brush only. To this end, the commutator has as many normal conductive segments cooperating with the fixed brush as the number of steps required for the rotor to equal one revolution, and the commutator has also one special segment which cooperates with the rotor-driven brush and is electrically connected with the normal segments so that the brushes are series-connected by the commutator segments for closure of the field coil circuit. Among these commutator segments the normal ones are spaced from each other and are of a width preferably more than adequate for contact of either one of them with the fixed brush during a complete forward step response of the rotor in normal motor operation and also when the commutator is on current interruption spring-driven to the leading end of its lost-motion connection with the rotor, while the special segment is of greater width than either of the normal segments and coordinated with the rotor-driven brush to be in contact therewith under the same conditions just mentioned at which a normal segment is in contact with the fixed brush, except that the rotor-driven brush slides off this special segment and thereby opens the field coil circuit substantially at the end of each normal forward step of the rotor. With this arrangement, the coordination of the conductive elements of the commutator and the coordination of the brushes with each other and with the commutator may be kept within fairly wide tolerances without adversely affecting the proper operational makes and breaks, yet the energization of the field coil for each operational rewind of the coupling spring is of absolute minimum duration and only a fraction of what it would be if the fixed brush and the commutator, especially if escapement-controlled, were to make the breaks of the commutation.

Another object of the present invention is to provide a motor of this type in still another form in which during its operation and for its start after a stop all operational makes and breaks of the commutation are made by a single conductive segment of the spring-driven commutator and a rotor-driven brush. To this end, the width of the commutator segment is such that the brush may be in contact therewith in any relative position of the rotor and commutator within their lost-motion range, and the commutator is provided with a cam which extends obliquely to and flanks the segment over the part of its width traversed by the brush during a full forward step of the rotor, while the brush is resilient and is, on successive forward steps of the rotor and intermittent stops thereof while the spring drive of the commutator continues, in the path of the opposite sides of the cam to be fixed thereby for its snap from and onto the segment, respectively, on release from the cam at the respective leading and trailing ends thereof.

Other objects and advantages will appear to those skilled in the art from the following, considered in conjunction with the accompanying drawings.

In the accompanying drawings, in which certain modes of carrying out the present invention are shown for illustrative purposes:

FIG. 1 is a side view, partly in section, of a motor embodying the present invention and as used in an exemplary clock;

FIGS. 2, 3 and 4 are fragmentary sections through the motor taken substantially on the lines 2—2, 3—3 and 4—4 respectively, of FIG. 1;

FIG. 6 is a fragmentary side view, partly in section, of a motor embodying the present invention in a modified manner;

FIG. 7 is a fragmentary section through the modified motor as taken on the line 7—7 of FIG. 6;

FIGS. 8 to 11 are fragmentary sections through the modified motor similar to FIG. 7, but showing certain prominent motor elements in different operating positions;

FIG. 12 is a fragmentary side view, partly in section, of a motor embodying the present invention in a further modified manner;

FIG. 13 is a fragmentary section taken on the line 13—13 of FIG. 12;

FIGS. 14 and 15 are fragmentary sections similar to FIG. 13, but showing certain prominent motor elements in different operating positions;

FIG. 16 is a diagrammatic view of one of the prominent elements of the motor of FIGS. 12 to 15;

FIG. 17 is a fragmentary side view, partly in section, of a motor embodying the present invention in another modified manner;

FIG. 18 is an enlarged fragmentary section taken substantially on the line 18—18 of FIG. 17;

FIG. 19 is a fragmentary side view, partly in section, of a motor embodying the present invention in still another modified manner;

FIG. 20 is a fragmentary section taken on the line 20—20 of FIG. 19;

FIG. 21 is a fragmentary side view, partly in section, of the motor of FIG. 19, but showing certain prominent motor elements in different operating positions;

Figure 1:
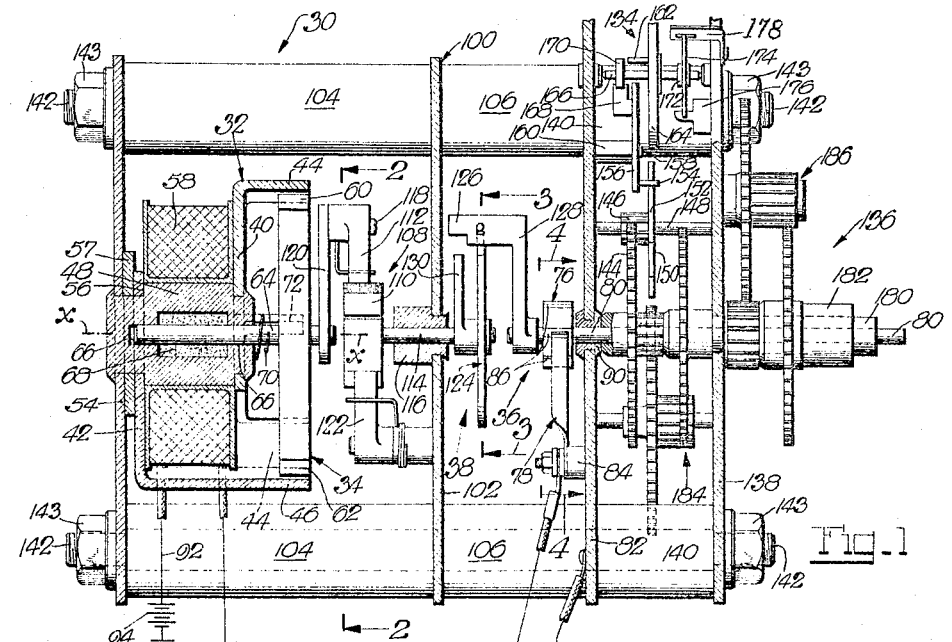

Referring to the drawings, and more particularly to FIGS. 1 to 5 thereof, the reference numeral 30 designates a motor which has as its major components a field structure 32, a rotor 34, a communication device 36 and a driving connection 38 between the rotor and commutation device.

Figure 2:
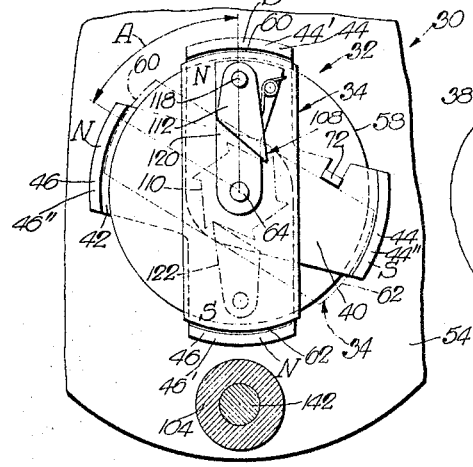

The field structure 32 comprises in this instance two field plates 40 and 42 with field poles 44 and 46, respectively, and a ferromagnetic core 48 to the opposite ends of which the field plates 40 and 42 are secured. More particularly, the field plate 40 is staked to one end of the core 48, while the other end of the core is staked to an end plate 54, with the other field plate 42 being secured in place by being firmly held between a shoulder 56 on the core 48 and a spacer 57 next to the end plate 54. Interposed between the field plates 40 and 42 and surrounding the core 48 is a field coil 58. As shown in FIGS. 1 and 2, the poles 44 and 46 of the respective plates 40 and 42 extend parallel to the center axis $x$—$x$ of the core 48 and are arranged circularly about this axis which is also the rotor axis of the motor, with the poles of each of the plates 40 and 42 being in this instance two in number and the poles of both plates being equally spaced apart from each other.

The rotor 34 is in this instance of permanent-magnet type and has two pole faces 60 and 62 of permanent opposite polarities, respectively, which in this instance are diametrically opposite each other. The rotor 34 is carried by a shaft 64 that is journalled in suitable bearing apertures 66 in the core 48 which is also provided with a lubricant-holding reservoir 68. The rotor 34, which is of exemplary oscillatory type, is by a spring 70 normally urged into the back-up position shown in dot-and-dash lines in FIG. 2 in which it rests against a stop lug 72 that may conveniently be struck-up from the field plate 40.

With the rotor 34 being of permanent-magnet type, the current applied to the field coil 58 for operation of the motor is D.C. current. Also, with the pole faces 60 and 62 of opposite polarity of the rotor 34 being diametrically opposite each other, the poles of either field plate 40 or 42 are preferably diametrically opposite the poles of the other field plate (FIG. 2). Further, with the rotor 34 being arranged to step from its described back-up position in exemplary clockwise direction (FIG. 2) in response to each energization of the field coil 58, and assuming that the pole faces 60 and 62 of the rotor 34 have the respective permanent polarities N and S indicated in FIG. 2, the field coil 58 is arranged so that on each energization thereof the field poles 44 and 46 are of S and N polarity, respectively, as also indicated in FIG. 2. Thus, on energization of the field coil 58, the rotor 34 will step from its back-up position clockwise into the full-line advance position (FIG. 2) against the urgency of the spring 70 (FIG. 1), with the rotor being thus stepped by being attracted with its pole faces 60 and 62 to the nearest S and N field poles 44′ and 46′, respectively, and being simultaneously repelled at the same pole faces from the nearest N and S field poles 46″ and 44″, respectively. The rotor 34 is returned by the spring 70 from its advance position to its back-up position immediately on each deenergization of the field coil 58.

The commutation device 36 comprises in this instance a commutator 76 and a brush 78 of which one is rotary and the other fixed, with the commutator being in this instance rotary and the brush fixed. To this end, the commutator 76 is carried by a rotary shaft 80, while the brush 78 is mounted through intermediation of an insulating spacer 84 on an electrically conductive plate 82 which is grounded at 85. The commutator 76 has in its periphery equiangularly spaced conductive segments 86 (FIGS. 1, 4 and 5) that are interconnected at 88 and in electrical contact with the conductive shaft 80 which through a conductive bearing 90 in the plate 82 is electrically connected with the latter. As shown in FIG. 1, one end of the field coil 58 is through a lead 92 connected with the positive terminal of a battery 94 the negative terminal of which is grounded at 96, while the opposite end of the field coil 58 is through a lead 98 connected with the brush 78. Accordingly, the circuit of the field coil 58 comprises the battery 94, lead 92, coil 58, lead 98, brush 78 and commutator 76, shaft 80, bearing 90 and plate 82, with this circuit being closed when the brush 78 engages one of the commutator segments 86.

The various operating parts of the motor are carried by a frame 100 which includes the plates 54, 82 and another intermediate plate 102, with these plates being held in spaced parallel relation with each other by pillars 104 and 106 and suitable bolts described hereinafter.

With the commutator shaft 80 being in this instance the torque output shaft of the motor and required to run in one direction, i.e., the stepping direction of the rotor 34, and with the rotor 34 being of oscillatory type as explained, the driving connection 38 between the rotor 34 and commutation device 36 must be such that it transmits only the stepping motions of the former to the latter. To this end, the driving connection 38 includes a one-way coupling 108 which is in the preferred form of a ratchet wheel 110 and an indexing pawl 112. The ratchet wheel 110 is carried by a shaft 114 which is journalled in a bearing 116 on the plate 102, while the pawl 112 is at 118 pivoted on an arm 120 on the rotor shaft 64 and spring-urged against the teeth of the ratchet wheel 110. As best shown in FIG. 2, the pawl 112 and ratchet wheel 110 are arranged to index the shaft 114 on each step of the rotor 34 in exemplary clockwise direction. There is further provided another pawl 122 which is pivoted on the plate 102 and spring-urged against the teeth of the ratchet wheel 110 to lock the same in any of its index positions against rotation in the opposite, anticlockwise, direction. The driving connection 38 further comprises a spring coupling 124 between the shafts 80 and 114. The spring coupling 124 is in this instance in the simple form of a spiral spring which is suitably anchored with its inner end to the shaft 114 and with its outer end to a lateral projection 126 on an arm 128 on the output shaft 80.

In order to impart to the output or load shaft 80 torque of the required magnitude on each step of the rotor 34, the coupling spring 124 is preloaded, i.e., prewound, and the same must remain preloaded when the motor stops in order to deliver torque of the required magnitude on each renewed start of the motor. To this end, there is provided between the shafts 114 and 80 a lost-motion connection which in this instance is formed by a phase arm 130 on shaft 114 and the arm 128 on the output shaft 80.

In normal operation of the motor, the coupling spring 124 will remain wound beyond its prewind extent as will be more fully explained hereinafter, and the same will, between rewinds by the stepping rotor 34, partially unwind at a rate depending on the magnitude of the load on the shaft 80 or on a predetermined escape rate of the latter. In the present example, the running rate of the output shaft 80 is under the control of an escapement 134 (FIG. 1), and the output shaft serves, as a further example, as the driver of a movement 136 of a battery-powered clock, such as an automobile clock, for instance. The movement 136 has for its endplates the described plate 82 and another plate 138 which by pillars 140 is held in spaced parallel relation with the plate 82, with all plates 54, 102, 82, 138 and pillars 104, 106, 140 being secured to each other by bolts 142 and nuts 143. The output shaft 80, which in this instance is also the sweep-second shaft of the movement 136, carries a gear 144 which is in permanent mesh with a pinion 146 on a staff 148 that is suitably journalled in the plates 82 and 138. Also fast on the staff 148 is an escape wheel 150 with the teeth 152 of which cooperate in conventional manner the pallet pins 154 on one end of an escape lever 156 which is rotatably supported at 158 on a stud 160 on the plate 82. Cooperating in conventional manner with the other end of the escape lever 156 are impulse pins 162 on a balance wheel 164 on a staff 166 which is journalled in suitable bearings in the plates 82 and 138. The escape lever 156 is also provided with a guard 168 which cooperates in conventional manner with a roller 170 on the staff 166. Secured to a collet 172 on the staff 166 is the inner end of a hairspring 174 the outer end of which is secured to an anchor piece 176 on the plate 138. A regulator 178 for the hairspring 174 may also be provided on the plate 138. The escapement 134 just described thus permits the spring-driven output shaft 80 to turn or escape at a uniform time rate.

The movement 136, besides including the escapement 134, further comprises a minute shaft 180 and an hour shaft 182 which may carry conventional minute and hour hands (not shown). The minute shaft 180 is in this instance journalled on the sweep-second shaft 80, while the hour shaft 182 is journalled on the minute shaft 180. The minute shaft 180 is driven at the proper rate from the sweep-second shaft 80 through a gear train 184, while the hour shaft 182 is driven at the proper rate from the minute shaft 180 by a gear train 186. The gear train 184 is provided with a conventional friction coupling (not shown) through which to set the minute and hour shafts without interrupting the normal drive of the clock.

Figure 3:
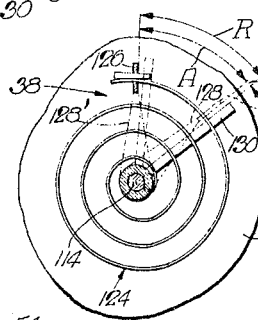

The field 32 of the motor is so arranged that the rotor 34 steps through an angle A of exemplary 60° on each energization of the field coil 58 (FIG. 2). Accordingly, the commutator 76 has six conductive segments 86 which are equiangularly spaced at 60° intervals. In operation of the motor, the rotor 34 steps intermittently under the control of the commutation device 36, while the output shaft 80 and with it the commutator 76 are constantly driven at a rate which in this instance is controlled by the escapement 134. To this end, the commutator 76 and brush 78 are so coordinated that they close the circuit of the field coil 58 for a forward step of the rotor 34 everytime the commutator reaches the end of its cyclic drive through the same angular distance, in this instance 60°, within the range of the aforementioned lost-motion connection between the shafts 114 and 80. Thus, assuming that on the escapement-controlled drive of the commutator 76 in the stepping direction of the rotor 34, this being in anticlockwise direction as viewed in FIGS. 4 and 5 (see arrows 190), the commutator has just reached the position in FIG. 4 in which the arm 128 is in the position 128' shown in FIG. 3 and its segment 86' has just contacted the brush 78 and closed the circuit of the field coil 58, the rotor 34 will immediately respond with a full forward step, with the pawl 112 and ratchet wheel 110 cooperating to index shaft 114 with the phase arm 130 and inner end of the coupling spring thereon through the same angle and in the same direction as the rotor, so that at the end of the rotor step the phase arm 130 assumes the full-line position in FIG. 3 and the coupling spring 124 has been rewound by 60° rotation of its inner end in clockwise direction as viewed in FIG. 3. The moment the rotor 34 reaches the end of its forward step, the locking pawl 122 will engage the next tooth on the ratchet wheel 110 and lock the same against rotation opposite to its indexing direction under the urgency of the coupling spring 124. With the magnetic torque in the rotor 34 on each forward step thereof being in this instance far in excess of that required to drive the relatively light load of the movement 136, the rotor 34 responds to each energization of the field coil 58 in an almost instantaneous complete forward step, although the field coil 58 will remain energized, and the rotor 34 in consequence held in its advance position (FIG. 2), until on the escapment-controlled drive of the commutator 76 in the direction of the arrow 190 in FIG. 4 the segment 86' moves out of contact with the brush 78 to open the circuit of the field coil 58 and release the rotor for spring-return to its back-up position. The rotor 34 will remain in its back-up position until on the continuous drive of the commutator 76 the next segment 86'' moves into contact with the brush 78 (FIG. 4) to cause a repetition of the described cyclic performance of the rotor 34, one-way coupling 108, phase arm 130, coupling spring 124 and commutator 76. The next commutator segment 86'' will thus come into initial contact with the brush 78 when the commutator 76 has been driven to the end of the requisite angle at which the arm 128 is in the dotted-line position in FIG. 3, i.e., close to, but still spaced from, the phase arm 130 by an angle C. Of course, the response of the rotor 34 to renewed closure of the circut of the field coil 58 is so immediate that the same will step forward before the arm 128 in its dotted-line position will come any closer to the phase arm 130 than is shown in FIG. 3. The commutator 76 and arm 128 will, during normal operation of the motor and for each forward step of the rotor 34, thus be driven through an angular distance A which is equal to each rotor step (FIGS. 2, 3 and 4), with the rotor 34 and phase arm 130 stepping forward everytime the commutator 76 and arm 128 reach the end of each cyclic drive through the distance A.

Assuming now that on the spring-drive of the commutator 76 the battery 94 fails to supply current to the field coil 58 for any reason whatsoever when the commutator segment 86'' contacts the brush 78 (FIG. 4), the field coil 58 will then remain deenergized and the phase arm 130 will remain in the full-line position shown in FIG. 3 owing to failure of the rotor 34 to step, wherefore the commutator 76 and the arm 128 will on their continued spring-drive beyond the dotted-line position of the latter (FIG. 3) soon reach a position in which the lateral projection 126 on the arm 128 comes to rest against the phase arm 130. The angular range R of the desired lost-motion connection between the shafts 114, 80 is thus equal to $A+C$ (FIG. 3), with the commutator 76 and arm 128 thus being spring-urged to one end of this range at which the projection 126 on the arm 128 rests against the phase arm 130.

Figure 4:
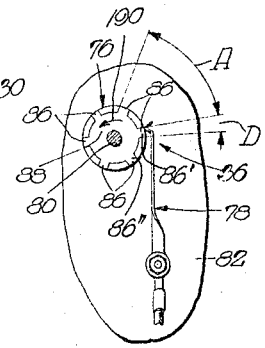
Figure 5:
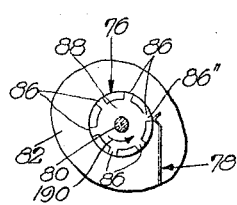
FIG. 5 is a fragmentary section similar to FIG. 4, but showing a prominent control device in a different operating position.

When on current interruption the projection 126 on the arm 128 comes to rest against the phase arm 130 in the exemplary full-line position in FIG. 3, the commutator 76 will come to rest in the position shown in FIG. 5 in which the segment 86'' is still in contact with the brush 78 so that on current restoration the field coil 58 will be energized and the rotor 34 step in consequence to resume normal operation of the motor. To this end, the width or angular extent D of each commutator segment 86 is larger than the excess C of the free-motion range R over the angle A (FIGS. 3 and 4), and this is imperative in order that on current interruption a commutator segment will be in engagement with the brush 78 when the commutator 76 and its arm 128 reach the forward end of the free-motion range R in the first place, and the same commutator segment will, on current restoration, remain in engagement with the brush 78 sufficiently long so that the rotor 34 will complete a forward step before this segment moves out of contact with the brush on the resumed drive of the commutator at the very start of the rotor's forward step in the second place. Of course, with the rotor 34 responding to field coil energization in an almost instantaneous complete forward step, the angular extent of each commutator segment 86 need be only slightly larger than the range excess C, and this angular extent of each commutator segment is preferably kept at a minimum in order to keep the circuit of the field coil closed for the briefest period for each step of the rotor in normal motor operation in order to keep current consumption at a minimum. Furthermore, while for normal operation of the motor the free-motion range R must necessarily be in excess of the angle A, it must also be less than twice the angle A in order to keep the coupling spring 124 within the same operational wind range after each motor stop, as will be readily understood.

Of course, current interruption may also occur during a forward step of the rotor 34 before completion of the same, in which case the rotor will immediately be spring-returned to its back-up position and the coupling spring 124 will as immediately back the phase arm 130 and ratchet wheel 110 against the locking pawl 122 from which they started on the incomplete forward step of the rotor, with the phase arm 130 being thus backed sufficiently rapidly that on the escapement-controlled spring-drive of the commutator 76 the projection 126 on the arm 128 will come to rest on the phase arm while the particular commutator segment is still in contact with the brush 78 for resumption of normal motor operation on current restoration.

For the purpose of operating the exemplary movement 136 or for many other purposes, the motor may be arranged to put out torque which is of fairly constant magnitude. This is achieved by preloading the coupling spring, and in this instance prewinding the exemplary spiral spring 124, to an extent where in normal motor operation its periodic partial unwinding and rewinding above its prewind level does not appreciably vary the force of the spring exerted on the output shaft 80. In the exemplary motor 30 the coupling spring 124 is at its preload level when the commutator 76 and its arm 128 are at the forward or leading end of the free-motion range R at which the projection 126 of the arm 128 rests against the phase arm 130, while the coupling spring is at higher operational load level during normal motor operation, i.e., while the commutator 76 and its arm 128 operate within the angle A of the free-motion range R (FIG. 3).

While in the described motor 30 the excess C of the free-motion range R over the stepping angle A of the rotor is necessarily very small in order to keep the periods of closure of the field coil circuit during normal motor operation at a current-saving minimum and yet achieve assured resumption of the motor drive on current restoration after current interruption, the modified motor 30a of FIGS. 6 to 11 permits considerably briefer closures of the field coil circuit during normal motor operation, yet the motor assuredly resumes normal operation on current restoration after current interruption. Thus, the motor 30a may in all respect be like the described motor 30, except that it has in the field coil circuit in parallel with the commutation device 36a a switch 194 having companion parts 196 and 198 associated with the commutator 76a and phase arm 130a, respectively. The switch part 196 is a sector-like insulating member 200 which is loose on the output shaft 80a and has with the commutator 76a a lost-motion connection 201 through a range r which is smaller than the stepping angle A1 of the rotor (FIG. 7), with the lost-motion connection 201 being fomed in this instance by a pin 202 in the commutator 76a and a slot 204 in the member 200 into which the pin 202 projects. The member 200 has peripheral surfaces 206 and 208 of different radii and an intermediate step shoulder 210, of which the surface 208 of smaller radius has next to the step shoulder 210 a contact 212 in the form of a lateral tongue on a conductive arm 214 (FIG. 7) which is in permanent contact with the output shaft 80a and thus connected with the grounded plate 82a (FIG. 6). The other switch part 198 is a conductive leaf spring 216 which is carried by the phase arm 130a on the shaft 114a and is yieldingly urged against either peripheral surface 206 or 208 of the member 200. The phase arm 130a is in this instance conductive and is at its mounting hub 220 in permanent contact with a brush 221 which through a lead 222 is connected with the lead 98a that connects one end of the field coil with the commutator brush 78a. Accordingly, the circuit of the field coil will be closed whenever the switch 194 is closed, the circuit then including the leads 98a and 222, brush 221, phase arm 130a, the then engaged contact and leaf spring elements 212 and 216 of the switch 194 (FIG. 9), output shaft 80a, bearing 90a and the grounded plate 82a (FIG. 6). As shown in FIG. 6, the coupling spring 124a is in this instance anchored with its inner end directly on the mounting hub 220 of the conductive phase arm 130a, and is secured with its outer end to the arm 128a on the output shaft 80a, with the arm 128a being either of insulating material or mounted on the output shaft 80a through intermediation of an insulating bushing in order to avoid permanent closure of the field coil circuit via the coupling spring 124a and arm 128a, as will be readily understood.

In normal operation of the motor 30a, the leaf spring element 216 of the switch 194 engages the peripheral surface 206 of the insulating member 200 (FIGS. 7 and 8), wherefore the switch 194 is then open. Thus, assuming that on the escapement-controlled spring-drive of the commutator 76a the same passes in clockwise direction through the position shown in FIG. 7 in which the field coil circuit has already been closed via the engaged commutator segment 86a' and brush 78a and the rotor and phase arm 130a have already responded in a full forward step, the leaf spring element 216 has on the quick forward step of the phase arm dragged the member 200 along by frictional engagement therewith until the latter reaches the leading end of its lost-motion connection 201 with the commutator at which the end 224 of its slot 204 comes to rest against the pin 202 on the slowly escaping commutator. With the phase arm 130a thus remaining in the index postion in FIG. 7 until the next rotor step and the member 200 being held in the position shown by the yieldingly engaging leaf spring element 216, the commutator 76a will on its continuous spring-drive from the position in FIG. 7 move with its pin 202 to the other end of its lost-motion connection with the member 200 and thereafter take the latter along to the end of its cyclic drive (FIG. 8) at which the next commutator segment 86a" contacts the brush 78a and causes the next forward step of the rotor and also of the phase arm 130a with its leaf spring element 216 which then again will drag the member 200 along to the opposite end of its lost-motion connection with the commutator. The phase arm 130a will, during normal motor operation, thus intermittently step forward of the continuously, but slowly, trailing commutator 76a and arm 128a, with the member 200 following the phase arm 130a on each forward step thereof to the leading end of its lost-motion connection 20 with the commutator 76a (FIGS. 7 and 8). The free-motion range R1 between the phase arm 130a and the commutator 76a with its arm 128a is thus as indicated in FIG. 7, i.e., equal to the angle A1 plus the angular distance C1, with the coupling spring 124a driving the commutator 76a and arm 128a to the forward end E of this free-motion range in case of current failure.

Assuming now that on the escapement-controlled spring-drive of the commutator 76a in clockwise direction (FIGS. 7 to 11) the current is interrupted when the commutator segment 86a''' passes the brush 78a (FIG. 9), the rotor and the phase arm 130a will then not be stepped forward and the latter will remain in the position shown, but the spring-drive of the commutator 76a and arm 128a will continue beyond the angle A1 of the free-motion range R1 to the end E thereof (FIG. 7), i.e., until the arm 128a comes to rest against the phase arm 130a and stops, together with the commutator, in the position shown in FIG. 9 in which no commutator segment 86a is in contact with the brush 78a. In the course of the spring-drive of the commutator 76a and arm 128a through the free-motion range R1 to the end E thereof on current interruption, the commutator will near the end of its drive through the angle A1 of the range R1 at the end of its lost-motion connection 201 with the member 200 (FIG. 8) and, hence, take the latter along to the end E of the range R1 near which the leaf spring element 216 not only snaps onto the contact 212 on the member 200 and, hence, closes the switch 194, but also yieldingly latches with the step shoulder 210 on the member 200 (FIG. 9). Accordingly, when current is restored, the field coil is immediately energized and the rotor, and with it the phase arm 130a, respond in a full forward step. To this end, the switch 194, and hence the circuit of the field coil, will remain closed until near the end of the forward step of the phase arm 130a owing to the follower motion of the thereto latched member 200 to the opposite end of its lost-motion connection 201 with the commutator at which the leaf spring element 216 is by the step shoulder 210 on the member 200 unlatched from the latter and rides onto the peripheral surface 206 of the member for the brief remainder of the forward step of the phase arm 130a (FIG. 10). This is achieved by making the range r of the lost-motion connection 201 between the commutator 76a and member 200 smaller than the stepping angle A1 as already described, and preferably making this range r only slightly smaller than the stepping angle A1 in order to make certain that the inertia of the rotor will carry it and the phase arm 130a to the end of the step after the switch 194 is opened. The commutator 76a will on its resumed escapment-controlled spring-drive advance relative to the member 200 which by its engagement with the leaf spring element 216 is then held against rotation, with the commutator being intermediate the range r of its lost-motion connection 201 with the member 200 when the next commutator segment 86a contacts the brush 78a and causes the next forward step of the rotor and phase arm 130a (FIG. 11). The motor will then revert to operation under the normal control of the commutator 76a and brush 78a in the manner shown in FIGS. 7 and 8, as will be readily understood.

Should current interruption occur during a forward step of the rotor and before completion of the same, the rotor, and with it the phase arm 130a, will quickly be returned to the position from which they started, and the commutator 76a and member 200 will be spring-driven to the end E of the free-motion range R1 at which the parts are in the relative positon shown in FIG. 9 in which the motor will resume operation immediately on current restoration.

Since the commutator segments 86a do not participate in a start of the motor on current restoration after current interruption, these segments may obviously be made of minimum width for closure of the field coil circuit for the briefest period during which the rotor and phase arm 130a will assuredly complete a forward step, thereby keeping current consumption at a highly economical minimum.

Reference is now had to FIGS. 12 to 15 which show another modified motor 30b that may in all respects be like the described motor 30 of FIG. 1, except that the commutation is different. Thus, the commutation device 36b of the present motor 30b provides a commutator 76b and two brushes 78b and 230 which are in series connection in the field coil circuit and are fixed and turnable with the phase arm 130b, respectively. The commutator 76b has a number of equi-angularly spaced "make" segments 86b at intervals equal to the stepping angle A2 of the rotor 34b (FIG. 13), i.e., 60° in this instance, which cooperate with the fixed brush 78b, and a single "make-and-break" segment 232 which cooperates with the other brush 230. The "make-and-break" segment 232 is in this instance connected with one of the "make" segments 86b (see also the diagrammatic commutator illustration of FIG. 16), and the "make" segments 86b are suitably connected with each other so that each is also connected with the "make-and-break" segment 232. The commutation is so arranged that the field coil circuit is closed whenever both brushes 230 and 78b are simultaneously in engagement with the segment 232 and one of the segments 86b, respectively, of the commutator, with the field coil circuit being then closed (FIG. 12) via the lead 98b from one end of the field coil, brush 78b and engaged commutator segment 86b, the other commutator segment 232, brush 230, conductive phase arm 130b and shaft 114b, brush 234 and plate 102b which is grounded at 236. Assuming now that in normal operation of the motor the phase arm 130b is in the intermittent index position in FIG. 13 and the commutator 76b has on its exemplary escapement-controlled spring-drive in clockwise direction just reached the position shown in FIG. 13 in which the leading end 238 of the "make" segment 86b' engages the brush 78b, the circuit of the field coil will at that instant be closed, and the rotor 34b, and with it the phase arm 130b, will, in consequence, make one complete forward step (FIG. 14). Thus, at the moment of circuit closure the fixed brush 78b is in the full-line position shown in FIG. 16, i.e., in engagement with the leading end 238 of the exemplary "make" segment 86b'', while the other brush 230 is in the full-line position (FIG. 16) in which the same is in engagement with the "make-and-break" segment 232. On the ensuing quick forward step of the rotor 34b and phase arm 130b into the next index position of the latter (FIG. 14), the fixed brush 78b will remain in engagement with the segment 86b on the commutator owing to the slow, escapement-controlled, advance of the latter, and the other brush 230, which advances with the phase arm 130b in the direction of the arrow 240 in FIG. 16, remains also in engagement with its commutator segment 232 until riding off the same at the leading end 242 thereof and, in consequence, opening the field coil circuit just before the phase arm 130b reaches the end of its forward step. This appears clearly from FIG. 16 in which the full step of the phase arm 130b is indicated by A2 and its terminal end at e, and the leading end 242 of the "make-and-break" segment 232 is rearwardly spaced from the terminal end e of the step A2. The brush 230 is at the very end of the forward step of the phase arm 130b thus well ahead of the commutator segment 232 (FIG. 14), and more particularly is then ahead of the latter over the distance d (FIG. 16), with the rotor 34b having sufficient inertia to carry it and the phase arm 130b to the end of the forward step when the brush 230 rides off the segment 232 to open the field coil circuit. The escapement-controlled spring-drive of the commutator 76b continues uninterruptedly on arrival of the phase arm 130b and brush 230 in the new index position in FIG. 14, with the exemplary commutator segment 86b' moving from engagement with the fixed brush 78b before the "make-and-break" segment 232 of the commutator again engages the brush 230. To this end, the width w of each of the "make" segments is smaller than the distance d at which the brush 230 is, at the moment of its arrival in its new index position (FIG. 14), spaced from its commutator segment 232 (FIG. 16). The phase arm 130b and brush 230 will thus remain in the new index position in FIG. 14 until on the continued drive of the commutator the leading end of the next "make" segment 86b'' engages the fixed brush 78b (FIGS. 14 and 16) to close the field coil circuit and again cause a complete forward step of the rotor 34b and phase arm 130b, with this circuit being again opened on the run-off of the brush 230 from its commutator segment 232 before the phase arm reaches the end of its step. The featured aspect of the present motor is thus field coil energization everytime a "make" segment 86b of the commutator moves into contact with the fixed brush 78b, with the field coil remaining energized, however, for only the briefest period, i.e., for only part of the exceedingly brief period during which the rotor makes a complete step. The present motor thus affords the ultimate in current saving.

On current interruption, the rotor 34b and phase arm 130b will either be quickly backed into the index position from which they started if the current interruption occurs during a forward step, or they will remain in the index position which they happen to assume the next time the commutation would ordinarily cause energization of the field coil but fails to do so owing to prior current interruption. In either case, the spring-drive of the commutator 76b will continue until its arm 128b moves into engagement with the phase arm 130b and becomes thereby stopped in a position such as shown in FIG. 15, for example. In this or any other position of the commutator 76b in which its arm 128b becomes on current interruption stopped on engagement with the phase arm 130b, the brushes 230 and 78b will be in engagement with the "make-and-break" segment 232 and one of the "make" segments 86b, respectively, so that the field coil will on current restoration be immediately energized and the motor resume its normal operation. In the exemplary stop position of the commutator 76b in FIG. 15 the fixed brush 78b happens to be in engagement with the "make" segment 86b' which is next to the "make-and-break" segment 232 (FIG. 16). If the current had not been interrupted, the rotor 34b and phase arm 130b would have been stepped forward when on the preceding drive of the commutator the leading end 238 of the segment 86b' came into engagement with the fixed brush 78b in its full-line position in FIG. 16. However, since the rotor and phase arm were then not stepped forward but remained in the index position of FIG. 15, the further continued drive of the commutator 76b and its arm 128b relative to the phase arm 130b over the distance d' (FIG. 16) carried the arm 128b into engagement with the phase arm in which the brushes 230 and 78b are still in engagement with their respective commutator segments 232 and 86b' as indicated by the dotted-line positions of these brushes (FIG. 16). While for simplicity of illustration FIG. 16 indicates this further continued drive, on current interruption, of the commutator 76b and arm 128b through the distance d' into engagement with the phase arm 130b by the full-line and dotted-line positions of the brushes 230 and 78b, these brushes remain in reality in their full-line positions and the commutator moves instead so that on engagement of the arm 128b with the phase arm 130b the commutator segments 232 and 86b' are coordinated with the respective brushes 230 and 78b as indicated by the dotted-line positions of the latter.

While in the motor 30b just described the field coil circuit is opened considerably before the rotor and phase arm complete each forward step, FIGS. 17 and 18 show a motor 30c in which the field coil circuit is opened substantially at the completion of each forward step of the rotor and phase arm 130c. The present motor 30c may in all respects be like the motor 30b, except that the commutator 76c and its arm 128c have a lost-motion connection 250 in the form of a detent 252 on the arm 128c and a slot 254 in the commutator 76c into which the detent 252 projects. Assuming now that in normal motor operation the phase arm 130c is in the exemplary index position shown in FIG. 18, the detent 252 is, during the escapement-controlled spring-drive of the commutator in anticlockwise direction, at the leading end of the lost-motion connection 250, as shown, in order to drive the commutator despite the friction it encounters from the yieldingly engaging brushes 230c and 78c. However, as the leading end of the next "make" segment 86c of the commutator moves during the drive of the latter into engagement with the fixed brush 78c to cause energization of the field coil, the brush 230c will, at the start of the ensuing forward step of the rotor and phase arm 130c anticlockwise as viewed in FIG. 18, take the commutator 76c along until the same is at the opposite, or trailing, end of its lost-motion connection 250 with the arm 128c, with the result that the leading end 242c of the "make-and-break" segment 232c is then advanced sufficiently to be disengaged from the brush 230c for circuit-opening just when, or very shortly before, the rotor and phase arm, and hence also the brush 230c, complete their forward step. The commutator 76c will then remain stationary until on the continuous drive of the arm 128c the same reaches the leading of its lost-motion connection 250 with the commutator to again drive the latter. With the commutator 76c thus pausing until the arm 128c again assumes the forward drive of the same, the "make" contacts 86c have been returned to proper coordination with the fixed brush 78c for renewed field coil energization on the drive of the arm 128c through the stepping angle of the rotor since the last forward step of the rotor and phase arm. The commutator 76c is thus alternately at each end of its lost-motion connection 250 with the arm 128c during normal motor operation, with the brush 230c exerting on the commutator sufficiently greater force than the fixed brush 78c to take the commutator along in coupled fashioned over the extent of its lost-motion connection 250 with the arm 128c on each forward step of the rotor and phase arm. In order that, on current interruption and ensuing drive of the commutator 76c and its arm 128c into engagement with the phase arm 130c, both brushes 230c and 78c will be in engagement with the "make-and-break" segment 232c and one of the "make" segments 86c, respectively, for renewed motor operation on current restoration, these segments are made of adequate width or angular extent, as shown.

Reference is now had to FIGS. 19 to 21 which show a motor 30d that performs according to the present invention with but a single conductive segment 260 on the commutator 76d and a single commutator brush 230d which is resiliently flexible and turns with the phase arm 130d. The commutator segment 260 may in its angular extent be like the commutator segment 232 of the motor 30b of FIGS. 12 to 16 in order to cooperate with the brush 230d to close the field coil circuit for each forward step of the rotor and phase arm 130d during normal motor operation and on each current restoration after current interruption. The commutator segment 260 is on one side flanked by an insulating cam 262 which extends obliquely to the travel direction, and is in the path, of the brush 230d, with the latter having its terminal end 264 bent so as to ride on the segment 260 or on the commutator periphery and also be in follower relation with the cam 262. The cam 262 extends from the leading end 266 of the segment 260 over an angular distance substantially equal to the stepping angle of the rotor and phase arm 130d. The segment 260 is suitably connected with a conductive ring 270 on the commutator 76d. On engagement of the brush 230d and commutator segment 260, the circuit of the field coil is closed via lead 98d from one end of the field coil, a brush 272, commutator ring and segment 270 and 260, brush 230d, conductive phase arm 130d and shaft 114d, a brush 272 and the grounded plate 102d.

In normal operation of the motor 30d, the commutator 76d has on its escapement-controlled spring-drive in anticlockwise direction (FIG. 20) just reached the exemplary position in FIG. 19 in which initial contact of the brush 230d with the segment 260 has been established, whereby the field coil circuit is closed and the rotor and phase arm 130d step forward. With the rotor and phase arm thus stepping forward, the brush 230d remains in engagement with the segment 260, and hence keeps the field coil circuit closed, until it runs off the leading end 266 of the segment 260 just prior to completion of a forward step of the rotor and phase arm. However, while thus riding over the segment 260, the brush 230d is by the side 276 of the cam 262 flexed in the fashion shown in FIG. 21 so that one run-off of this brush from the leading ends 266 and 278 of the segment 260 and cam 262, respectively, the same will recover from its flexure and then be in the direct path of the other side 280 of the cam 262. This side 280 of the cam will, on the continued drive of the commutator, flex the brush 230d in the opposite direction and thus not only hold the same out of contact with the segment 260 but also flex it in the correct direction for its snap onto and into reengagement with the segment 260 for the next forward step of the rotor and phase arm when the trailing end 282 of the cam clears the flexed brush (FIG. 19). The brush 230d will during normal motor operation thus be alternately flexed by the opposite sides of the cam 262 while being in and out of engagement with the commutator segment 260. Further, the commutator segment 260 extends from the trailing cam end 282 rearwardly sufficiently so that, on current interruption and ensuing drive of the commutator 76d and its arm 128d into engagement with the phase arm 130d, the segment 260 will still be in engagement with the brush 230d for resumption of motor operation on current restoration.

Figure 22:
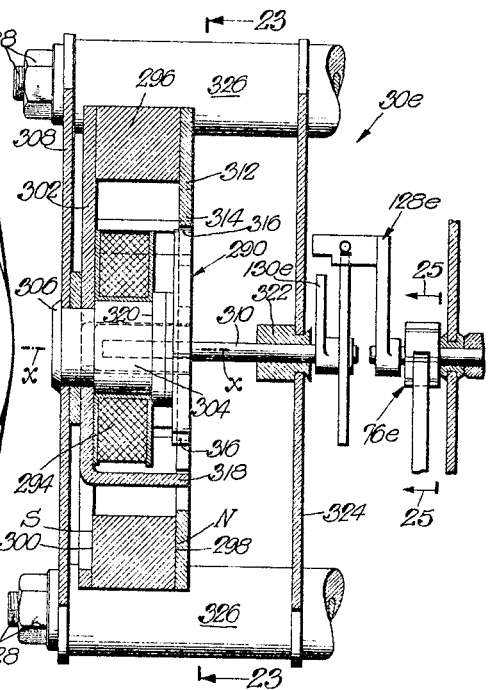
FIG. 22 is a fragmentary side view, partly in section of a motor embodying the present invention in a further modified manner.

While in the previously described motors the rotor is of oscillatory type, FIGS. 22 to 27 show a motor 30e the rotor 290 of which is of stepping type, i.e., is moved in one direction only. The rotor 290 is of ferromagnetic material and is on each energization of a field coil 294 subjected to alternate magnetic fields for a single forward step. To this end, there is provided, in addition to the field coil 294, a permanent-magnet 296 of exemplary ring shape with the opposite pole faces 298 and 300 thereof of exemplary N and S polarity, respectively (FIG. 22). The magnet 296 is with its face 300 mounted in any suitable manner on a field plate 302 which, in turn, is mounted on a ferromagnetic core 304 that is staked at 306 to an endplate 308, with the core 304 providing a preferably lubricated bearing for a shaft 310 which carries the rotor 290. Suitably mounted on the opposite face 298 of the magnet 296 is another field plate 312 having field poles 314 to cooperate with the pole faces 316 of the rotor 290. Also adapted to cooperate with the rotor pole faces 316 are additional field poles 318 which are struck from the field plate 302 and bent into parallelism with the rotor axis x. The field coil 294 surrounds the core 304 and is interposed between a shoulder 320 on the latter and the field plate 302. The rotor shaft 310 is further journalled in a bearing 322 on another endplate 324 (FIG. 22) which is mounted on and held in parallelism with the other endplate 308 by pillars 326 and suitable screws and nuts 328. The rotor shaft 310 carries a phase arm 130e, while the rest of the motor to the right of the phase arm 130e (FIG. 22) may be like the motor 30 of FIG. 1.

Figure 23:
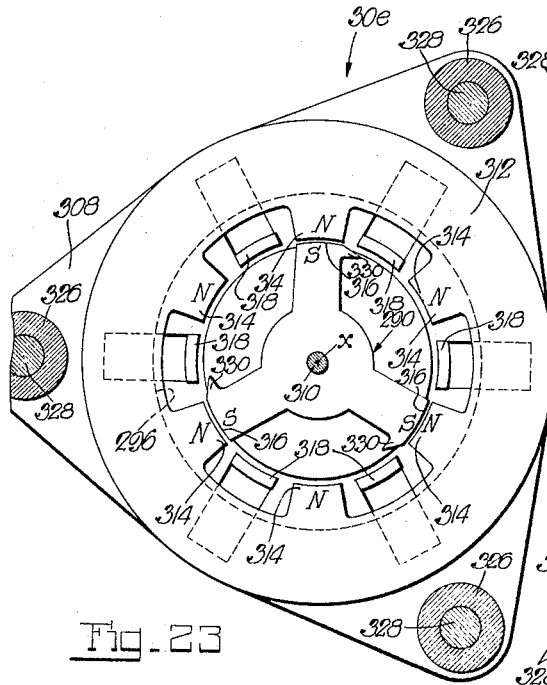
FIG. 23 is a fragmentary section taken substantially on the line 23—23 of FIG. 22.

The rotor 290 has in this instance 3 equiangularly spaced pole faces 316, requiring six field poles 314 and six field poles 318 in order to step the rotor through exemplary 60° for each field coil energization. With the field coil 294 deenergized, the rotor 290 is held in any one of six repose positions in which its pole faces 316 are in alignment with the field poles 314 (FIG. 23). This is due to the fact that the field poles 314 have the permanent polarity of the magnet face 298, in this example N, with which they are linked through the field plate 312, while the rotor pole faces 316 are then of exemplary S polarity owing to their being then magnetically linked to the opposite magnet face 300 of exemplary S polarity via the rotor 290, core 304 and field plate 302.

Figure 24:
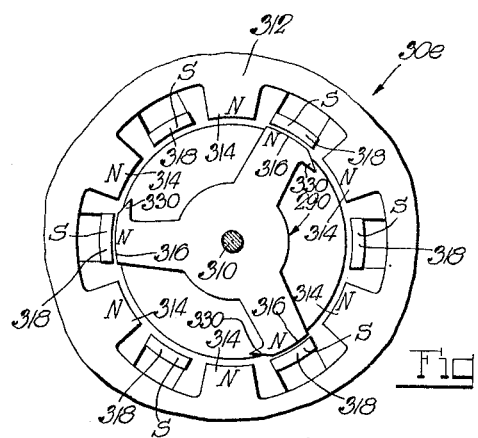
FIG. 24 is a fragmentary section similar to FIG. 23, but showing certain prominent motor elements under different operating conditions.
Figure 25:
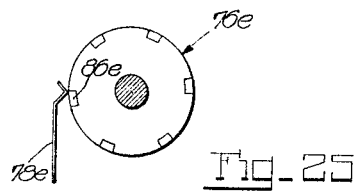
FIG. 25 is a fragmentary section taken on the line 25—25 of FIG. 22.
Figure 26:
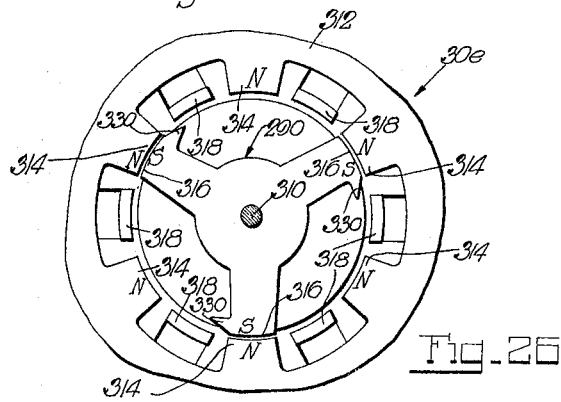
FIG. 26 is a fragmentary section similar to FIG. 24, but showing certain prominent motor elements under different operating conditions.
Figure 27:
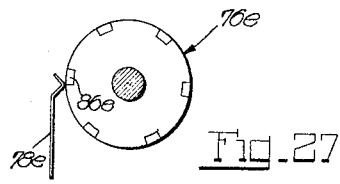
FIG. 27 is a fragmentary section similar to FIG. 25, but showing a prominent motor element in a different operating position.

Assuming now that in the exemplary rotor repose position of FIG. 23 the escapement-controlled commutator 76e has on its spring-drive in exemplary clockwise direction just reached the position of FIG. 25 in which the brush 78e contacts the nearest commutator segment 86e, the circuit of the field coil 294 is closed, with the latter being arranged to produce S polarity in the field poles 318 (FIG. 24) and, hence, N polarity in the rotor pole faces 316. Accordingly, and with the rotor pole faces 316 having the extensions 330 toward the clockwise nearest field poles 318 (FIG. 23), the rotor pole faces are repelled from the adjacent field poles 314 of permanent N polarity and attracted to the clockwise nearest field poles 318 temporary S polarity (FIG. 24). With the rotor thus stepping into the intermediate position in FIG. 24, continued clockwise spring-drive of the commutator 76e will bring its segment 86e out of contact with the brush 78e (FIG. 27), causing deenergization of the field coil 294 and, hence, revision of the rotor pole faces 316 to their S polarity induced by the permanent magnet 296, with ensuing pull of the rotor into the next repose position (FIG. 26). The rotor is thus stepped in clockwise direction through 60° on each energization of the field coil 294, as will be readily understood.

It will be noted that FIG. 22 that the rotor-drive of the face arm 130e lacks an intermediate mechanical one-way coupling, such as the coupling 108 in the motor of FIG. 1. However, the present motor 30e has a full equivalent for such a mechanical one-way coupling in the magnet-induced permanent N polarity of the field poles 314 and S polarity of the rotor pole faces 316 during field coil deenergization. Thus, if an account of current interruption during a forward step of the rotor the latter fails to reach an intermediate position, for example that shown in FIG. 24, the rotor will quickly be spring-backed into the repose position in FIG. 23 in which it will become magnetically locked to the field poles 314 of permanent N polarity, with the commutator arm 128e then moving into engagement with the backed phase arm 130e to be stopped thereby in a position in which the commutator segment 86e is still in engagement with the brush 78e to cause energization of the field coil 294 and renewed stepping of the rotor on current restoration.

Figure 28:
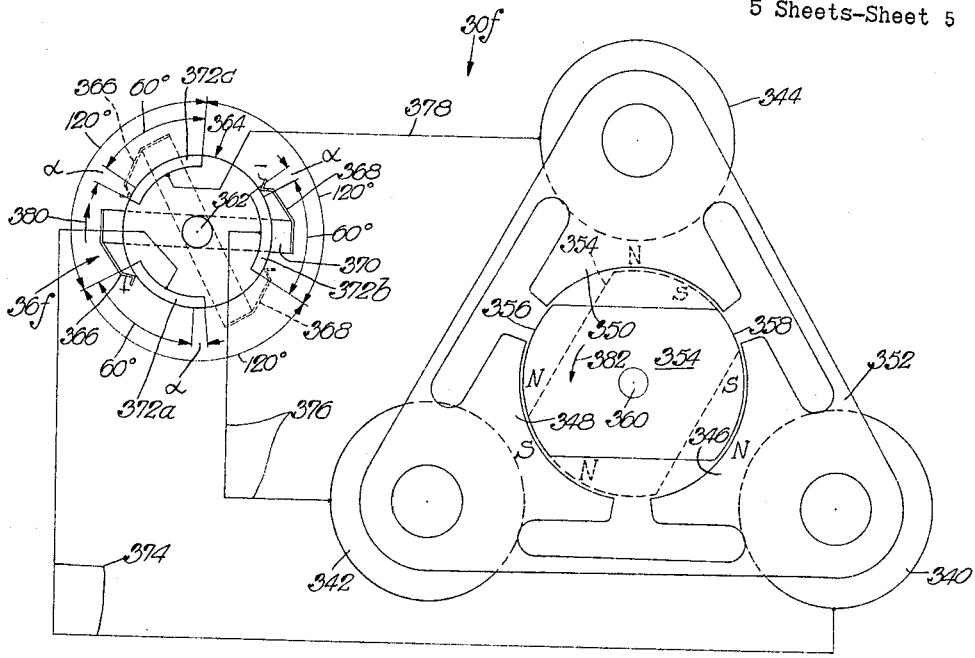
FIG. 28 is a diagrammatic view of a motor embodying the present invention in a still further modified manner.

While in the previously described motors there is only one field coil, the present invention may also be embodied in a motor with more than one field coil and with a stepping rotor. FIG. 28 shows diagrammatically a motor 30f of the present invention having an exemplary number of 3 field coils 340, 342 and 344 associated with field poles 346, 348 and 350, respectively, of a field plate 352. Cooperating with the field poles 346 to 350 is a rotor 354 with pole faces 356 and 358 of exemplary permanent N and S polarities, respectively. The rotor 354 is carried by a shaft 360 which is operatively connected with a rotary commutator brush shaft 362 through intermediation of a one-way coupling and a spring coupling (neither shown) but being like or similar to the coupling 108 and spring 124 of the motor in FIG. 1, and also including a phase arm and a follower arm like or similar to the arms 130 and 128, respectively, in FIG. 1. The commutation device 36f of the present motor 30f is also different from those of the previously described motors in that the commutator 364 is stationary and the brushes 366 and 368 rotary, the latter being to this end provided on a carrier 370 on the brush shaft 362. With the commutation calling for rotor stepping through exemplary 60° for each field coil energization, the commutator has 3 conductive segments 372a, 372b and 372c which through leads 374, 376 and 378 are connected with one end of the respective coils 340, 342 and 344, with the other ends of the latter connected in Y or Δ fashion (not shown). Of the rotary brushes, brush 366 is suitably connected with a D.C. source and brush 368 is suitably connected to ground. The brushes 366 and 368 are arranged to contact the commutator 364 at diametrically opposite places, and they may be assumed to be spring-driven in clockwise direction (arrow 380), while the rotor 354 may be assumed to step counterclockwise (arrow 382). The segments 372a, 372b and 372c of the commutator are of identical peripheral width, 60°+α in this instance, and they are equi-angularly spaced 120° at their ends which are leading in clockwise direction around the commutator periphery.

Assuming now that during normal escapement-controlled spring-drive of the commutator brushes 366, 368 they pass through the momentary full-line position in which the field coils 340 and 342 are energized to induce the exemplary N and S polarities in the respective field poles 346 and 348 and no polarity in the field pole 350, the rotor 354 responds by moving into the full-line position. However, with the spring-drive of the brushes continuing in clockwise direction, brush 366 will soon ride off the commutator segment 372a and cause deenergization of the field coils 340 and 342, with all field coils being deenergized until the brushes reach on their continued spring-drive the dotted-line position in which brush 368 is still in contact with commutator segment 372b and brush 366 has just made contact with commutator segment 372c, thereby energizing the field coils 342 and 344 and, in consequence, inducing S and N polarities in the respective field poles 348 and 350 and no polarity in the field pole 346, with the rotor 354 responding by stepping from the full-line position counterclockwise into the dotted line position, i.e., 60°. The rotor 354 thus steps each time field coil energization occurs, as will be readily understood.

The α extent of each commutator segment 372a, b and c may be the same as the D extent of the commutator segments 86 in the motor of FIG. 4, i.e., it must be sufficient to enable the rotor to respond in a full step to each field coil energization, and to keep the respective field coil circuitry closed via the commutator and brushes if on current interruption during a forward step of the rotor the latter is spring-backed to its last repose position and the mentioned follower arm on the brush carrier 370 moves into engagement with and is stopped by the also mentioned phase arm which backs with the brushes, so that the rotor will resume stepping as soon as current is restored, as will be readily understood.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In a motor, the combination with coil means, a rotary element, means operative on successive energizations of said coil means to step said element in one direction into successive positions equally spaced from each other at an angle of less than 360°, a rotary device, preloaded spring means interposed between and drivingly connecting said element and device, and means providing for free operational relative rotation between said element and device through a range within which said spring means remains preloaded and to one end of which said device is urged by said spring means, with said range being in excess of, but less than twice, said angle, of means locking said element in said positions only against rotation opposite to said one direction; and circuit means for said coil means, including brush and commutator units of which one unit is said device, with said units arranged to close said circuit means when in any of said positions of said element said one unit is in position at either end of an endlength of said range which extends from said one end thereof over a distance substantially equal to said range excess, and to open said circuit means at the end of the drive of said one unit from either of said positions thereof through a distance smaller than said angle.

2. The combination in a motor as set forth in claim 1, in which said coil means is a single coil, said stepping means includes a field excitable by said coil and an associated permanent-magnet rotor being turned from a rest position in said one direction through a distance substantially equal to said angle on each coil energization and being spring-returned to said rest position on each coil deenergization, and said element is formed by one of the companion parts of a one-way coupling the other part of which is carried by said rotor and drives said one part in said one direction on each rotor turn from said rest position.

3. The combination in a motor as set forth in claim 1, in which said coil means is a single coil, said stepping means includes a field excitable by said coil and an associated rotor which constitutes said element and is stepped into said successive positions of said element on successive energizations of said coil.

4. In a motor, the combination with coil means, a rotary element, means operative on successive energizations of said coil means to step said element in one direction into successive positions equally spaced from each other at an angle which multiplied by a whole number equals 360°, a rotary device, preloaded spring means interposed between and drivingly connecting said element and device, and means providing for free operational relative rotation between said element and device through a range within which said spring means remains preloaded and to one end of which said device is urged by said spring means, with said range being in excess of, but less than twice, said angle, of means locking said element in only said positions thereof against rotation opposite to said one direction; and circuit means for said coil means, including brush and commutator units of which one unit is said device, with said units arranged to close said circuit means when in any of said positions of said element said one unit is in any position within an endlength only of said range which extends from said one end thereof over a distance substantially equal to said range excess, and to open said circuit means at the end of the drive of said one unit from any of said positions thereof through a distance smaller than the difference between said angle and range excess.

5. In a motor, the combination with a coil, a rotary element, means operative on successive energizations of said coil to step said element in one direction into successive positions equally spaced from each other at an angle which multiplied by a whole number equals 360°, a rotary device, preloaded spring interposed between and drivingly connecting said element and device, and means providing for free operational relative rotation between said element and device through a range within which said spring remains preloaded and to one end of which said device is urged by said spring, with said range being in excess of, but less than twice, said angle, of means locking said element in only said positions thereof against rotation opposite to said one direction; and a circuit for said coil including brush and commutator units of which one unit is said device and the other unit is fixed, said brush unit is a single brush and said commutator units has equiangularly spaced conductive segments equal to said number, with each of said segments being of an angular extent larger than said range excess but smaller than said angle, and said one unit being so located that in any of said positions of said element said brush engages one of said segments when said one unit is in any position within an endlength only of said range which extends from said one end thereof over a distance substantially equal to said range excess, and said circuit being closed on engagement of said brush with any of said segments.

6. In a motor, the combination with a coil, a rotary element, means operative on successive energizations of said coil to step said element in one direction into successive positions equally spaced from each other at an angle which multiplied by a whole number equals 360°, a rotary device, a preloaded spring interposed between and drivingly connecting said element and device, and means for proving for free operational relative rotation between said element and device through a first range within which said spring remains preloaded and to one end of which said device is urged by said spring, with said range being in excess of, but less than twice, said angle, of means locking said element in only said positions thereof against rotation opposite to said one direction; and a circuit for said coil including first and second units connected in parallel in said circuit, said first unit being brush and commutator parts of which one part is said device and the other part is fixed and said commutator part has equi-angularly spaced conductive segments equal to said number, with said other part being so located and said segments being of such angular extent that in any of said positions of said element said brush part engages one of said segments when said one part is driven to a position spaced from said one range end a distance substantially equal to said range excess, and disengages therefrom at the end of the drive of said one part from said position thereof through a distance smaller than said range excess, and said second unit is a switch having a member and first and second contacts carried by said member and element, respectively, of which said member is turnable relative to and coaxially of said one part and has therewith a lost-motion connection through a second range smaller than said angle, with said member being at one end of said second range for its drive by said one part, and said contacts engage each other in one relative position only of said element and member in which said one part and member are at said one ends of said first and second ranges, respectively, and means releasably coupling said member and element in only said one relative position thereof for joint motion to the other end only of said second range, with said circuit being closed either during engagement of said brush part with any of said segments or during engagement of said contacts.

7. The combination in a motor as set forth in claim 6, in which said coupling means are a spring latch on said element and a shoulder on said member with which said latch is in yielding interlock in said one relative position of said element and member, with said spring latch being said second contact and being cammed from interlock with said shoulder on motion of said element beyond said other end of said second range.

8. In a motor, the combination with a coil, a rotary element, means operative on successive energizations of said coil to step said element in one direction into successive positions equally spaced from each other at an angle which multiplied by a whole number equals 360°, a rotary device, a preloaded spring interposed between and drivingly connecting said element and device, and means providing for free operational relative rotation between said element and device through a range within which said spring remains preloaded and to one end of which said device is urged by said spring, with said range being in excess of, but less than twice, said angle, of means locking said element in only said positions thereof against rotation opposite to said one direction; and a circuit for said coil, including two brushes and a commutator in series connection in said circuit, of which a first brush turns with said element and the second brush is fixed, and said commutator is said device and has a first conductive segment and second equi-angularly spaced conductive segments equal to said number and electrically connected with said first segment, with each of said second segments being of an angular extent larger than said range excess but smaller than said angle, and said second brush being so located that in any of said positions of said element said second brush engages one of said second segments when said commutator is in any position within an endlength only of said range which extends from said one end thereof over a distance substantially equal to said range excess, and said first segment being so coordinated with said first brush and of such angular extent that it will be in engagement with said first brush in any relative position of said element and commutator within said range except within an endlength thereof which extends from the other end of said range over another distance smaller than said angle, with said circuit being closed on simultaneous engagement only of said first and second brushes with said first segment and one of said second segments, respectively.

9. The combination in a motor as set forth in claim 8, in which said other distance is smaller than said range excess.

10. In a motor, the combination with a coil, a rotary element, means operative on successive energization of said coil to step said element in one direction into successive positions equally spaced from each other at an angle which multiplied by a whole number equals 360°, a rotary device, a preloaded spring interposed between and drivingly connecting said element and device, and means providing for free operational relative rotation between said element and device through a first range within which said spring remains preloaded and to one end of which said device is urged by said spring, with said range being in excess of, but less than twice, said angle, of means locking said element in only said positions thereof against rotation opposite to said one direction; and a circuit for said coil, including two brushes and a commutator in series connection in said circuit, of which a first brush turns with said element and the second brush is fixed, and said commutator has a first conductive segment and second equiangularly spaced conductive segments equal to said number and electrically connected with said first segment, said commutator being turnable relative to and coaxially of said device and having therewith a lost-motion connection through another range smaller than said angle, with said commutator being at one end of said second range when driven by said device, and a friction coupling between said element and commutator whereby the latter is taken along by said element to the other end only of said other range on each step of said element relative to said device, each of said second segments being of an angular extent smaller than said angle but larger than the combined extent of said second range and said access of said first range, and said second brush being located to engage that end of one of said second segments which leads in said one direction when in any of said positions of said element said device reaches a position within said first range spaced from said one end thereof a distance substantially equal to said access of said first range, said first segment being of such angular extent and said first brush being so coordinated with said first segment that they are in engagement with each other when in any of said positions of said element said device reaches any position within an endlength of said first range which extends from said one end thereof over a distance substantially equal to said excess of said first range and until said element reaches substantially the end of its next step, with said circuit being closed on simultaneous engagement only of said first and second brushes with said first segment and one of said second segments, respectively.

11. In a motor, the combination with a coil, a rotary element, means operative on successive energizations of said coil to step said element in one direction into successive positions equally spaced from each other at an angle of less than 360°, a rotary device, a preloaded spring interposed between and drivingly connecting said element and device, and means providing for free operational relative rotation between said element and device through a range within which said spring remains preloaded and to one end of which said device is urged by said spring, with said range being in excess of, but less than twice, said angle, of means looking said element in only said positions thereof against rotation opposite to said one direction; and a circuit for said coil means, including a resiliently flexible brush turning with said element and a commutator which is said device and has a single conductive segment and a non-conductive cam, with said circuit being closed on engagement between said brush and segment, said segment being of an angular extent slightly larger than that of said range and having ends leading and trailing, respectively, in said one direction, and said brush being coordinated with said segment so as to be in engagement with said segment near said trailing end thereof when in any of said positions of said element said commutator is at said one end of said range said cam extending from said leading end toward the trailing end, and along one side, of said segment obliquely to and in the path of rotation of said brush and being coextensive with a part of said segment of an angular extent substantially equal to said angle, with said brush riding on each step of said element over said segment part and being by one side of said cam flexed to one side while remaining in engagement with said segment part until said brush rides off the end of said cam at said leading segment end and recovers, whereupon on the drive of said commutator said brush is by the other cam side flexed to the opposite side and held out of engagement with said segment until the other cam end clears said brush and the latter recovers from its flexure to said opposite side and reengages said segment.

References Cited by the Examiner

UNITED STATES PATENTS 2,624,017    12/1952    Putnocky _____ 310—49 X

MILTON O. HIRSCHFIELD, *Primary Examiner.*

J. W. GIBBS, *Assistant Examiner.*